(12) United States Patent
Alshihi

(10) Patent No.: US 9,609,487 B2
(45) Date of Patent: Mar. 28, 2017

(54) SYSTEM FOR PROVIDING LOCATION RELEVANT INFORMATION

(71) Applicant: Harib Darwish Alshihi, Al Jafliya (AE)

(72) Inventor: Harib Darwish Alshihi, Al Jafliya (AE)

( * ) Notice: Subject to any disclaimer, the term of this patent is extended or adjusted under 35 U.S.C. 154(b) by 37 days.

(21) Appl. No.: 14/409,589

(22) PCT Filed: Jun. 21, 2013

(86) PCT No.: PCT/IB2013/055101
§ 371 (c)(1),
(2) Date: Dec. 19, 2014

(87) PCT Pub. No.: WO2013/190511
PCT Pub. Date: Dec. 27, 2013

(65) Prior Publication Data
US 2015/0148075 A1    May 28, 2015

(30) Foreign Application Priority Data

Jun. 21, 2012  (GB) .................................. 1211013.6

(51) Int. Cl.
*H04W 24/00* (2009.01)
*H04W 4/04* (2009.01)
*H04W 4/02* (2009.01)

(52) U.S. Cl.
CPC ........... *H04W 4/043* (2013.01); *H04W 4/021* (2013.01); *H04W 4/023* (2013.01)

(58) Field of Classification Search
CPC ....... H04W 48/16; H04W 4/02; H04W 4/021; H04W 4/023; H04W 4/043

USPC .................................. 455/456.3, 456.1, 566
See application file for complete search history.

(56) References Cited

U.S. PATENT DOCUMENTS

| | | | | |
|---|---|---|---|---|
| 7,567,527 B2 * | 7/2009 | Perlman | ................ | H04W 88/08 370/315 |
| 8,565,791 B1 * | 10/2013 | Schilit | ................... | H04W 64/00 455/41.1 |
| 8,570,914 B2 * | 10/2013 | Sauer | .................... | H04W 64/00 370/278 |
| 8,706,137 B2 * | 4/2014 | Sridhara | ............... | H04W 4/021 455/404.2 |
| 8,812,015 B2 * | 8/2014 | Das | ........................ | G01C 21/20 455/456.1 |
| 8,818,401 B2 * | 8/2014 | Gupta | ................... | G01S 5/0236 455/411 |

(Continued)

*Primary Examiner* — Joseph Arevalo
(74) *Attorney, Agent, or Firm* — Wiggin and Dana LLP; Joseph Casino; Jonathan D. Hall

(57) ABSTRACT

A system for providing location relevant information to users of a plurality of mobile devices within a multi-storey building. A plurality of transmitters are located in different locations across multiple floors of the building. Each transmitter transmits a signal for identifying the location of its associated transmitter and signals transmitted at least by transmitters located on the same floor share at least one common transmission parameter. The mobile devices each run software that identifies signals received substantially concurrently from the transmitters, determining the closest transmitter, and then displays on the mobile device location relevant information associated with that location.

13 Claims, 2 Drawing Sheets

(56) References Cited

U.S. PATENT DOCUMENTS

| | | | | |
|---|---|---|---|---|
| 8,909,255 B1* | 12/2014 | Eriksson | ............... | H04W 4/02 |
| | | | | 455/422.1 |
| 9,167,552 B2* | 10/2015 | Versteeg | ............... | G01S 5/0252 |
| 9,253,596 B2* | 2/2016 | Sridhara | ............... | H04W 4/023 |
| 9,304,185 B2* | 4/2016 | Patel | ............... | G01S 5/0289 |
| 9,305,353 B1* | 4/2016 | Chen | ............... | G06T 7/0032 |
| 2008/0009970 A1* | 1/2008 | Bruemmer | ............ | G05D 1/0088 |
| | | | | 700/245 |
| 2012/0087212 A1* | 4/2012 | Vartanian | ............... | G01S 15/08 |
| | | | | 367/118 |
| 2012/0239191 A1* | 9/2012 | Versteeg | ............... | G06N 3/004 |
| | | | | 700/246 |
| 2014/0348013 A1* | 11/2014 | Terrenoir | ............ | G01S 5/0252 |
| | | | | 370/252 |

\* cited by examiner

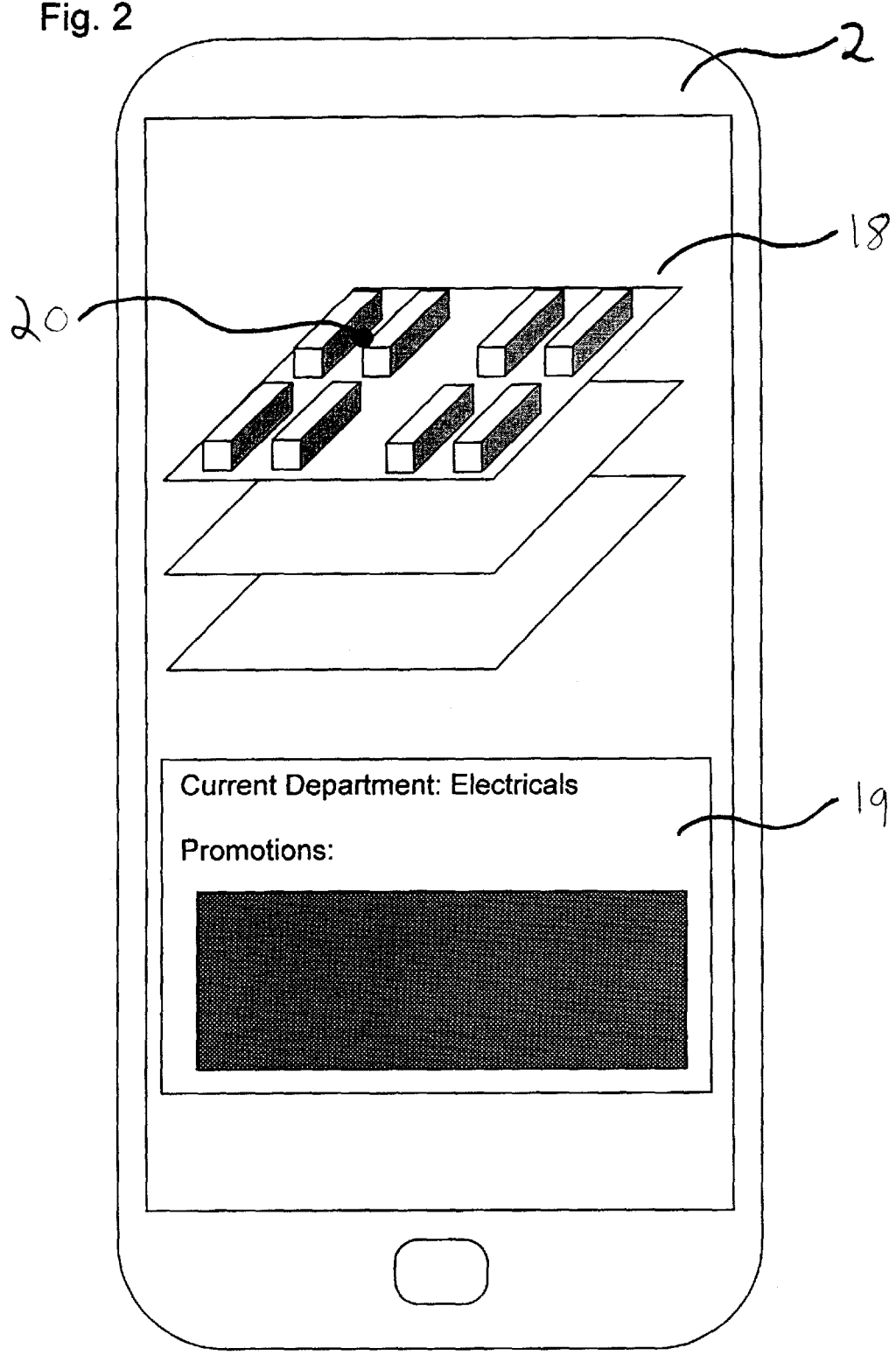

SYSTEM FOR PROVIDING LOCATION RELEVANT INFORMATION

REFERENCE TO RELATED APPLICATIONS

This application is a National Phase of PCT/IB2013/055101 filed on Jun. 21, 2013 and entitled "SYSTEM FOR PROVIDING LOCATION RELEVANT INFORMATION" and claims priority of GB 1211013.6 filed on Jun. 21, 2012 and entitled "SYSTEM FOR PROVIDING LOCATION RELEVANT INFORMATION." The disclosures of PCT/IB2013/055101 and GB 1211013.6 are hereby incorporated by reference herein in their entirety.

FIELD OF DISCLOSURE

The present invention concerns a system for providing location relevant information to mobile devices, and more particularly to mobile devices within a multi-storey building and providing three dimensional location information. The present invention also concerns a method and software for use in such a system.

BACKGROUND

In this connection, in recent years there has been increased use of mobile devices, such as smart phones, tablets and portable media players. One popular use of such devices is to provide location relevant information, such as maps. For example, many mobile devices now have GPS functionality incorporated, which allows their current location to be displayed on a map and, for example, allows the user to obtain directions or information about nearby attractions.

A problem with GPS is that it is not always very accurate and is often slow. For example, GPS works well for in-car navigation because multiple measurements can be taken as the vehicle moves along a number of fixed paths (i.e. roads). This allows the system to generate an apparently accurate location result, even though the raw data itself may contain timing and positional errors. However, for slow moving bodies which have more freedom of movement (e.g. such as a user on foot), GPS often does not provide sufficiently accurate results. Furthermore, GPS often cannot operate in interior locations since a GPS receiver requires unobstructed line of sight with four GPS satellites. The GPS signals are therefore not able to penetrate a building's walls or underground locations. Moreover, GPS also cannot distinguish between different elevations and therefore it cannot be used to provide information as to which floor of a building a user is on. This limits the applications of GPS location systems. As such, a navigation system relying on GPS is wholly unsuitable for use by a user inside a multi-storey building, such as a multi-storey shopping mall, museum or car park.

Accordingly, the present invention seeks to address some of the problems associated with GPS location systems.

BRIEF SUMMARY

According to an aspect of the present invention, there is provided a system for providing location relevant information to users of a plurality of mobile devices within a multi-storey building, the system comprising:

a plurality of transmitters located in different locations across multiple floors of the building, each transmitter for transmitting a signal for identifying the location of its associated transmitter, and wherein signals transmitted at least by transmitters located on the same floor share at least one common transmission parameter; and software for running on the plurality of mobile devices, the software being operable on each mobile device for:
 identifying signals received substantially concurrently from two or more of the plurality of transmitters;
 determining the closest transmitter on the same floor as the mobile device based at least in part on the at least one common transmission parameter of received signals from the two or more of the plurality of transmitters; and
 displaying on the mobile device location relevant information associated with the location of the determined closest transmitter.

In this way, rather than attempting to determine its absolute location using triangulation techniques, the system allows a mobile device to receive signals from one or more transmitters and allows the operating software running on the mobile device to determine its approximate location based on which transmitter it is closest/nearest to. That is, the mobile device is effectively assumed to have approximately the same location as the closest transmitter based on the received signals. As the system also associates each transmitter with location relevant information relevant to its location, the operating software running on the mobile device can utilise the determined closest transmitter to then provide this information to the user. When the user moves so that a different transmitter is the closest transmitter, the new location relevant information associated with that different transmitter can then be displayed. The system also recognises when the user using the mobile device moves from one storey or floor of a multi-storey building to another.

Although the present invention would appear to provide a more coarse location estimate as compared to GPS in terms of absolute location, it offers a number of distinct advantages. Firstly, the present invention provides for the determined location to be more contextually relevant because the closest transmitter can be determined with a high accuracy. As such, by locating the transmitters in defined areas, the mobile device is able to reliably distinguish between different areas, even when there are minimal differences in their location in geographical terms. Secondly, the present invention does not rely upon line of sight communication with GPS satellites or communication within a cellular network. As such, the present invention can be located indoors, across multiple floors. Thirdly, the present invention is able to distinguish between different elevations within a building by providing transmitters on the different floors of a building and having common transmission parameters between the transmissions to allow comparison. Finally, the present invention allows for relatively simple processing to determine its location, since it does not need to employ the complex timing and multi-signal triangulation techniques associated with GPS.

In an embodiment, the at least one common transmission parameter includes signal strength and the software determines the closest transmitter based at least in part on received signal strength and/or received signal noise. In this way, a mobile device is able to easily analyse the plurality of location signals it receives from the plurality of transmitters and identify which transmitter is closest.

In an embodiment, the at least one common transmission parameter includes signal timing and the software determines the closest transmitter based at least in part on the received signal timing. In this way, a mobile device is able to easily analyse the plurality of location signals it receives from the plurality of transmitters and identify which transmitter is closest.

In an embodiment, the at least one common transmission parameter includes a floor identification artifact for identifying the respective floor on which the transmitter it located.

In an embodiment, determining the closest transmitter comprises identifying the floor on which mobile device is located based on the floor identification artifacts of the signals received by two or more of the plurality of transmitters.

In an embodiment, the floor on which the mobile device is located is identified by selecting the floor with the highest number of detected floor identification artifacts.

In an embodiment, determining the closest transmitter comprises discounting received signals having interference above a predetermined threshold indicative of transmission through the building's structure.

In an embodiment, determining the closest transmitter comprises discounting received signals having a signal strength below a predetermined threshold indicative of transmission through the building's structure.

In an embodiment, each of the plurality of transmitters comprises a receiver for receiving a location signal request from the mobile device, the transmitters for transmitting their signal in response to a received request.

In an embodiment, the plurality of transmitters are configured to transmit their signals after a substantially identical delay after receiving a request for location information, wherein the software of each mobile device determines its closest transmitter based at least in part on the timing of the received signals. In this way, a mobile device is able to accurately identify its nearest transmitter by timing the return location signals.

In an embodiment, the system further comprises a server for storing the location relevant information for access by the mobile device. In this way, the location relevant information is held centrally, allowing it to be easily managed and updated by the system provider.

In an embodiment, the software is operable to display a map of the multi-storey building on the respective mobile devices. In an embodiment the map is a 3D map.

In an embodiment, the software is operable to display the determined location of the user using the respective mobile device.

According to a further aspect of the present invention, there is provided software for a mobile device for providing location relevant information within a multi-storey building, the software comprising operable instructions for:
identifying signals received substantially concurrently from two or more of a plurality of transmitters located in different locations across multiple floors of the building, each transmitter transmitting a signal for identifying the location of its associated transmitter, and wherein signals transmitted at least by transmitters located on the same floor share at least one common transmission parameter; and
displaying on the mobile device location relevant information associated with the location of the determined closest transmitter.

In an embodiment, the software further comprises operable instructions for actioning the transmission of a location signal request to the plurality of distributed transmitters, the plurality of distributed transmitters transmitting their signals in response thereto.

In an embodiment, the software further comprises operable instructions for timing between the transmission of the location signal request and the receipt of the signals in response thereto, the closest transmitter being determined based at least in part on the timing of the received location signal.

According to a further aspect of the present invention, there is provided a mobile device for providing location relevant information within a multi-storey building, the mobile device comprising:
a receiver;
a display;
a processor; and
a memory, the memory having stored thereon instructions for processing by the processor, the instructions for:
identifying signals received at the receiver substantially concurrently from two or more of a plurality of transmitters located in different locations across multiple floors of the building, each transmitter transmitting a signal for identifying the location of its associated transmitter, and wherein signals transmitted at least by transmitters located on the same floor share at least one common transmission parameter; and
determining the closest transmitter on the same floor as the mobile device based at least in part on the at least one common transmission parameter of received signals from the two or more of the plurality of transmitters; and
displaying on the display location relevant information associated with the location of the determined closest transmitter.

According to a further aspect of the present invention, there is provided a method for providing location relevant information to users of a plurality of mobile devices within a multi-storey building, the method comprising:
locating a plurality of transmitters in different locations across multiple floors of the building;
transmitting a signal for identifying the location of its associated transmitter from each transmitter, wherein the signals transmitted at least by transmitters located on the same floor share at least one common transmission parameter;
running software on the plurality of mobile devices, the software being operable on each mobile device to:
identify signals received substantially concurrently from two or more of the plurality of transmitters;
determine the closest transmitter on the same floor as the mobile device based at least in part on the at least one common transmission parameter of received signals from the two or more of the plurality of transmitters; and
display on the mobile device location relevant information associated with the location of the determined closest transmitter.

According to a further aspect of the present invention, there is provided a system for providing location relevant information, comprising:
a plurality of transmitters for location at different locations, each transmitter for transmitting a location signal identifying its associated transmitter, and
wherein the location signals are configured for allowing a mobile device to determine its closest transmitter and provide location relevant information associated with the location of that transmitter.

BRIEF DESCRIPTION OF THE DRAWINGS

Illustrative embodiments of the present invention will now be described in relation to the accompanying drawings, in which:

FIG. 2 shows a mobile device used in the embodiment shown in FIG. 1.

DETAILED DESCRIPTION OF THE DRAWINGS

Figure 1:
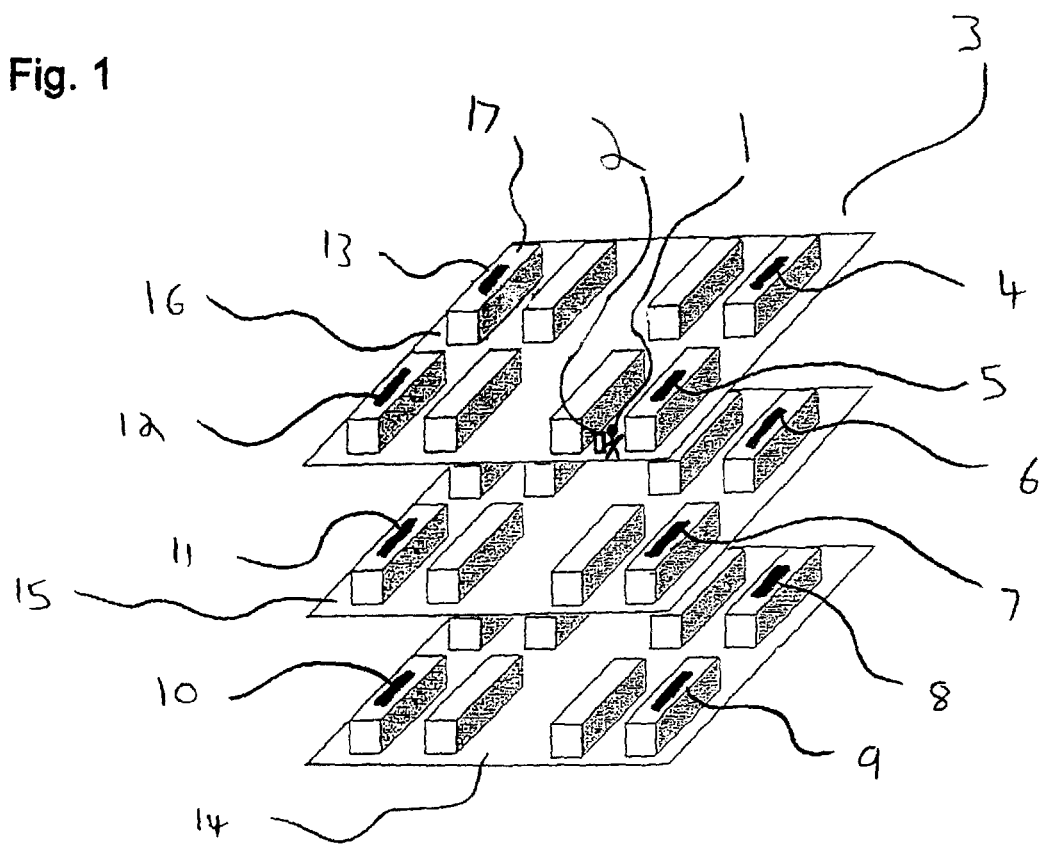
FIG. 1 shows a schematic diagram of an embodiment of the present invention implemented across three floors.

FIG. 1 illustrates an embodiment of the present invention implemented across three floors of a multi-storey department store. The 3D floor plan 3 shown in FIG. 1 provides a perspective view of the department store's ground floor 14, first floor 15 and second floor 16. Each floor has four departments 17, which relate to different products, and each department is provided with its own wireless transmitter 4-13.

Each of the wireless transmitters 4-13 is configured to use a wireless local area network protocol (e.g. WiFi™) and has a relatively limited range which ideally corresponds generally to an area associated with its department 17. In use, the transmitters 4-13 each periodically transmit a unique location signal which all have the same amplitude and are transmitted at the same time based on a common system clock. As such, the signals share common transmission parameters that have been determined by the system provider and therefore allow signals transmitted by different transmitters to be compared.

Each location signal contains a transmitter ID which can be used by a mobile device 2 to identify the originating transmitter. Furthermore, the location signals from transmitters located on the same floor share a common floor identification artifact. This feature allows signals originating from the same floor to be easily identified.

FIG. 1 also shows a user 1 of mobile device 2. In this embodiment, the mobile device 2 is provided with a pre-installed software application which contains a look-up table which links each transmitter ID with a data file containing location relevant information for the location associated with that transmitter. For example, transmitter IDs for transmitters 4-13 may link to data files relevant to the departments within which the transmitters are located. Transmitters located on the exterior of the store (not shown) may link to data files providing more general information on current in-store promotions for attracting passing customers. As such, the transmitter ID provides a proxy for the transmitter's location. The mobile device's software application is also configured to allow for the look-up table and data files to be updated.

The mobile device 2 also comprises a wireless receiver which is capable of receiving transmissions from the plurality of transmitters 4-13. In use, the software application interfaces with the wireless receiver and analyses the signals received substantially concurrently from one or more of the plurality of transmitters 4-13 to identify which transmitter the mobile device 2 is closest to.

In this connection, the mobile device 2 is able to determine its closest transmitter based on one or more of the techniques of analysing received signal strength, received signal noise, and received signal timing. For example, in this illustrative embodiment, the user 1 is on the second floor 16 of the department store and therefore their mobile device 2 will receive location signals from the second floor wireless transmitters 4, 5, 12, 13. At the same time, they may also detect a weak transmission from the wireless transmitter 7 located on the floor below.

Of the received location signals, the signal transmitted by transmitter 5 will have a relatively stronger signal strength and/or relatively less signal noise and/or will be received earlier than the other location signals because the user's mobile device 2 is located nearest to this. In this embodiment, due to the proximity of the transmitters 4, 5, 12, 13 to one another, all three of the above techniques are employed in combination to improve the systems accuracy. However, it will be understood that in other embodiments, only one or different combinations of techniques may be used.

In terms of proximity, the wireless transmitter 7 located on the first floor below is also relatively close to the user 1. However, the software can discount this signal on the basis of one or more of a low signal strength and/or the presence of an interference pattern indicative of transmission though the floor itself.

In preferred embodiments, the software may also analyse the floor identification artifacts of the received signals to determine which floor the user is currently on and use this to filter signals which originate from different floors. For instance, using the above example, the mobile device may detect signals from wireless transmitters 4, 5, 12, 13 and 7. Of these, the software can determine that four signals originate from second floor transmitters, whereas only a single transmission originates from the first floor, and therefore the user is on the second floor 16. This feature can be advantageous where building features, such as atriums and stairwells, mean that in particular locations wireless transmissions originating from different floors may be comparably strong to transmissions originating from the same floor as the user.

Once the mobile device 2 determines its closest transmitter (i.e. transmitter 5 in FIG. 1), the software application uses the determined transmitter ID for that transmitter to identify the associated data file using its look-up table. The mobile device then loads the associated data to retrieve the location relevant information for that area and display it on the mobile device's display.

FIG. 2 shows the mobile device 2 displaying the location relevant information associated with the location of transmitter 5 in FIG. 1. In this embodiment, this location relevant information includes a 3D map 18 which indicates to the user 1 that they are currently on the second floor, with dot 20 designating they are in the electrical department. Alternatively, the software may highlight the relevant department in the display to indicate the current location. The user may therefore use the map 18 to navigate to other departments within the same store. In this embodiment, the location relevant information also includes information 19 regarding the relevant department, such as details of current promotions in that department which may be of interest to the user 1.

The mobile device 2 is configured to periodically re-scan for the closest transmitter. As such, when user 1 moves to a new location on the same or a different floor so that they are nearer to a different transmitter, this new transmitter is identified as the new closest transmitter. As a consequence, the location relevant information associated with that new transmitter is loaded and displayed on the mobile device's screen.

In this way, the present invention allows location relevant information to be provided to a user based on a simplified and reliable method of identifying the closest local transmitter across multiple floors. This avoids the need to employ complex timing and multi-signal triangulation techniques, and allows location relevant data to be provided in situations where GPS signals are unavailable and cannot provide suitable elevation information.

It will be understood that the embodiment illustrated above shows applications of the invention only for the purposes of illustration. In practice the invention may be applied to many different configurations, the detailed embodiments being straightforward for those skilled in the art to implement.

In this respect, for example, in a further embodiment of the present invention, the transmitters 4-13 may be configured to respond to requests submitted by mobile devices for location relevant data. That is, each transmitter 4-13 may be provided with a receiver for receiving requests from a mobile device 2. The mobile device 2 is configured to output such a request and, in response, any transmitter within range receives the request then outputs a location signal. The mobile device 2 can then analyse any received location signals to determine the closest transmitter based on one or more of signal strength, signal noise, and signal delay. In this embodiment, for signal delay, the mobile device 2 may time from the output of its location request to the time of the location signal is received. As such, the total time delay will be the sum of the output and return signal paths, thereby allowing for improved contrast between different transmitters.

Furthermore, in the above illustrative embodiment, the mobile device 2 is provided with the location relevant data pre-installed. However, in other embodiments, the location signals may incorporate the location relevant data. Alternatively, once the mobile device identifies its closest transmitter, it may establish a connection with that transmitter and use this connection to download the location relevant data from a data store.

Moreover, in embodiments, a user may also be permitted to access location relevant data remotely, for example, by selecting the location on their mobile device's map. Such a facility would allow a user to browse information regarding locations in advance, before deciding on whether to travel there. The user may then also be provided with directions for traveling to the selected new locations based on their determined current location. In embodiments, a user may be required to register with the system in order to access the location relevant data remotely.

Furthermore, in embodiments, the system may further be provided with an administrator which records the locations visited by mobile devices when a two-way connection is established between the mobile device and one or more of the transmitters.

Furthermore, the operating software may also filter out any weak location signals which have a power level or signal to noise ratio below a predetermined threshold. This may save processing resources.

Furthermore, whilst above illustrative embodiment utilises WiFi™, it will be understood that the present invention could use other wireless protocols, such as Bluetooth.

Finally, although in the above illustrative embodiment the present invention has been described in reference to a department store, the system may be applied to other applications. For example, shopping centres could implement the system to help users navigate and to provide information about nearby stores. For example, a transmitter could be provided in each store so that a user receives location relevant information applicable to that store as they move around the centre. The system could also be used in tourist locations, such as museums, or in warehouses for goods picking.

The invention claimed is:

1. A system for providing location relevant information to users of a plurality of mobile devices within a multi-storey building, the system comprising:
   a plurality of transmitters located in different locations across multiple floors of the building, each transmitter for transmitting a signal for identifying the location of its associated transmitter, and wherein signals transmitted by transmitters located on the same floor share at least one common transmission parameter and a common floor identification artifact for identifying the floor on which the respective transmitters are located; and
   software for running on the plurality of mobile devices, the software being operable on each mobile device for:
   identifying signals received substantially concurrently from two or more of the plurality of transmitters;
   determining the closest transmitter on the same floor as the mobile device based at least in part on the at least one common transmission parameter and by identifying the floor on which the mobile device is located by selecting the floor associated with the highest number of detected common floor identification artifacts from the signals received from the two or more of the plurality of transmitters; and
   displaying on the mobile device location relevant information associated with the location of the determined closest transmitter.

2. The system according to claim 1, wherein the at least one common transmission parameter includes signal strength and the software determines the closest transmitter based at least in part on received signal strength and/or received signal noise.

3. The system according to claim 1, wherein the at least one common transmission parameter includes signal timing and the software determines the closest transmitter based at least in part on the received signal timing.

4. The system according to claim 1, wherein determining the closest transmitter comprises discounting received signals having interference above a predetermined threshold indicative of transmission through the building's structure.

5. The system according to claim 1, wherein determining the closest transmitter comprises discounting received signals having a signal strength below a predetermined threshold indicative of transmission through the building's structure.

6. The system according to claim 1, wherein each of the plurality of transmitters comprises a receiver for receiving a location signal request from the mobile device, the transmitters for transmitting their signal in response to a received request.

7. The system according to claim 6, wherein the plurality of transmitters are configured to transmit their signals after a substantially identical delay after receiving a request for location information, wherein the software of each mobile device determines its closest transmitter based at least in part on the timing of the received signals.

8. The system according to claim 1, further comprising a server for storing the location relevant information for access by the mobile device.

9. The system according to claim 1, wherein the software is operable to display a map of the multi-storey building on the respective mobile devices.

10. The system according to claim 9, wherein the map is a 3D map.

11. The system according to claim 1, wherein the software is operable to display the determined location of the user using the respective mobile device.

12. A mobile device for providing location relevant information within a multi-storey building, the mobile device comprising:
- a receiver;
- a display;
- a processor; and
- a memory, the memory having stored thereon instructions for processing by the processor, the instructions for:
- identifying signals received substantially concurrently from two or more of a plurality of transmitters located in different locations across multiple floors of the building, each transmitter transmitting a signal for identifying the location of its associated transmitter, and wherein signals transmitted at least by transmitters located on the same floor share at least one common transmission parameter and a common floor identification artifact for identifying the floor on which the respective transmitters are located; and
- determining the closest transmitter on the same floor as the mobile device based at least in part on the at least one common transmission parameter and by identifying the floor on which the mobile device is located by selecting the floor associated with the highest number of detected common floor identification artifacts from the signals received from the two or more of the plurality of transmitters; and
- displaying on the display location relevant information associated with the location of the determined closest transmitter.

13. A method for providing location relevant information to users of a plurality of mobile devices within a multi-storey building, the method comprising:
- locating a plurality of transmitters in different locations across multiple floors of the building;
- transmitting a signal for identifying the location of its associated transmitter from each transmitter, wherein the signals transmitted at least by transmitters located on the same floor share at least one common transmission parameter;
- running software on the plurality of mobile devices, the software being operable on each mobile device to:
- identify signals received substantially concurrently from two or more of a plurality of transmitters located in different locations across multiple floors of the building, each transmitter transmitting a signal for identifying the location of its associated transmitter, and wherein signals transmitted at least by transmitters located on the same floor share at least one common transmission parameter and a common floor identification artifact for identifying the floor on which the respective transmitters are located; and
- determine the closest transmitter on the same floor as the mobile device based at least in part on the at least one common transmission parameter and by identifying the floor on which the mobile device is located by selecting the floor associated with the highest number of detected common floor identification artifacts from the signals received from the two or more of the plurality of transmitters; and
- display on the mobile device location relevant information associated with the location of the determined closest transmitter.

* * * * *